US011117190B2

(12) United States Patent
Swank et al.

(10) Patent No.: US 11,117,190 B2
(45) Date of Patent: Sep. 14, 2021

(54) USING THIN-WALLED CONTAINERS IN POWDER METALLURGY

(71) Applicant: GREAT LAKES IMAGES & ENGINEERING, LLC, Troy, OH (US)

(72) Inventors: John P. Swank, Troy, OH (US); Robert M. Conaway, Columbus, OH (US); Hugh M. Davis, Dublin, OH (US)

(73) Assignee: Great Lakes Images & Engineering, LLC, Troy, OH (US)

( * ) Notice: Subject to any disclaimer, the term of this patent is extended or adjusted under 35 U.S.C. 154(b) by 612 days.

(21) Appl. No.: 15/479,380

(22) Filed: Apr. 5, 2017

(65) Prior Publication Data
US 2017/0291221 A1 Oct. 12, 2017

Related U.S. Application Data

(60) Provisional application No. 62/319,327, filed on Apr. 7, 2016.

(51) Int. Cl.
*B22F 3/15* (2006.01)
*B33Y 10/00* (2015.01)
(Continued)

(52) U.S. Cl.
CPC ............... *B22F 3/15* (2013.01); *B22F 3/24* (2013.01); *B22F 10/20* (2021.01); *B33Y 10/00* (2014.12); *B33Y 80/00* (2014.12); *C25D 1/10* (2013.01); *B22F 2003/247* (2013.01); *B22F 2201/10* (2013.01); *B22F 2998/10* (2013.01); *B22F 2999/00* (2013.01); *Y02P 10/25* (2015.11)

(58) Field of Classification Search
CPC .. B22F 3/15; B22F 3/1055; B22F 3/24; B22F 2998/10; B22F 2999/00; B22F 2201/10; B22F 2003/247; B33Y 80/00; B33Y 10/00; C25D 1/10; Y02P 10/295
USPC .......................................................... 419/49
See application file for complete search history.

(56) References Cited

U.S. PATENT DOCUMENTS 3,982,934 A * 9/1976 Wentzell .................. B22F 3/04
419/8
4,065,303 A 12/1977 Seilstorfer et al.
(Continued)

OTHER PUBLICATIONS

Conaway, R. M.; "Global Trends in HIP"; International Conference on Hot Isostatis Pressing; HIP 2011; Paris; May 22, 2005.
(Continued)

*Primary Examiner* — Rebecca Janssen
(74) *Attorney, Agent, or Firm* — Thomas E. Lees, LLC

(57) ABSTRACT

A method for creating a metallurgic component comprises creating a thin-walled container corresponding to a shape of the metallurgic component from a metal. If powder metal is not already in the container (depending on a method of creating the container), the thin-walled container is filled with powder metal. A quick-can device is fixed to the thin-walled container, and the powder metal is consolidated inside the thin-walled container (e.g., in a hot isostatic press). During consolidation, pressure within the thin-walled container is monitored and a desired pressure differential between an inside of the thin-walled container and an outside of the thin-walled container is maintained by the quick-can device.

7 Claims, 7 Drawing Sheets

(51) Int. Cl.
*B22F 3/24* (2006.01)
*B22F 10/20* (2021.01)
*B33Y 80/00* (2015.01)
*C25D 1/10* (2006.01)

(56) References Cited

U.S. PATENT DOCUMENTS

| | | |
|---|---|---|
| 4,261,745 A | 4/1981 | Watanabe et al. |
| 4,300,959 A | 11/1981 | Hurwitz et al. |
| 4,526,747 A | 7/1985 | Schimmel et al. |
| 4,927,600 A | 5/1990 | Miyashita et al. |
| 5,110,542 A * | 5/1992 | Conaway .................. B22F 3/15 |
| | | 419/25 |
| 5,137,663 A | 8/1992 | Conaway |
| 5,156,321 A | 10/1992 | Liburdi et al. |
| 5,169,577 A | 12/1992 | Feichtinger |
| 7,407,622 B2 | 8/2008 | Voice et al. |
| 2010/0008019 A1* | 1/2010 | Burn ..................... C04B 35/465 |
| | | 361/321.4 |
| 2013/0071627 A1 | 3/2013 | Archer |
| 2016/0243621 A1* | 8/2016 | Lucas ....................... B22F 5/10 |

OTHER PUBLICATIONS

News & Views; Powder Metallurgy, vol. 33, No. 4; pp. 289-302; 1990.

\* cited by examiner

USING THIN-WALLED CONTAINERS IN POWDER METALLURGY

CROSS REFERENCE TO RELATED APPLICATIONS

This application claims the benefit of U.S. Provisional Patent Application Ser. No. 62/319,327, filed Apr. 7, 2016, entitled USING THIN-WALLED CONTAINERS IN POWDER METALLURGY, the disclosure of which is hereby incorporated herein by reference.

BACKGROUND

Various aspects of the present invention relate generally to the technological field of powder metallurgy and specifically to the technological field of using a thin-walled container during a powder metallurgical process.

Powder metallurgy uses powder metals to create objects while greatly reducing a need for a metal removal process. Generally, powder metal is compacted to form a desired shape (i.e., a preform), which is then heated to densify. The result is a dense metal shape that requires very little work to become the final product.

For example, in hot isostatic pressing (HIP), powder metal fills a mold that is the desired shape. The mold is packed, evacuated of atmosphere, sealed, and placed in a hot isostatic press, where the mold heated and subjected to high pressure for a length of time to consolidate the powder metal into the desired shape. The consolidated form is removed from the mold and if necessary is worked to remove extraneous metal.

BRIEF SUMMARY

According to aspects of the present invention, method for creating a metallurgic component comprises creating a thin-walled container corresponding to a shape of the metallurgic component from a metal. If powder metal is not already in the container (depending on a method of creating the container), the thin-walled container is filled with powder metal. A quick-can device is fixed to the thin-walled container, and the powder metal is consolidated inside the thin-walled container (e.g., in a hot isostatic press). During consolidation, pressure within the thin-walled container is monitored and a desired pressure differential between an inside of the thin-walled container and an outside of the thin-walled container is maintained by the quick-can device.

DETAILED DESCRIPTION

According to aspects of the present disclosure, a metallurgical component is created by monitoring a pressure differential between an inside of a thin-walled container and an outside of the thin-walled container during consolidation in a hot isostatic press. If the pressure differential indicates there is a leak in the thin-walled container (e.g., the presence of interconnected microporosity), then an action may take place (e.g., stopping consolidation, applying a positive or negative pressure to the inside of the thin-walled container to minimize the leak, etc.).

Further, several methods are presented to create the thin-walled container, which is typically thinner than a standard-walled container (i.e., "can") or a multi-layered container. For example, walls of the thin-walled container may be less than one millimeter thick and preferably between two-hundred micrometers and three-hundred-sixty micrometers, while walls of normal multi-layered containers are more than two millimeters thick. Detecting leaks through the use of pressure differential and taking an action if there is a leak allows for the use of these thin-walled containers.

Figure 1:
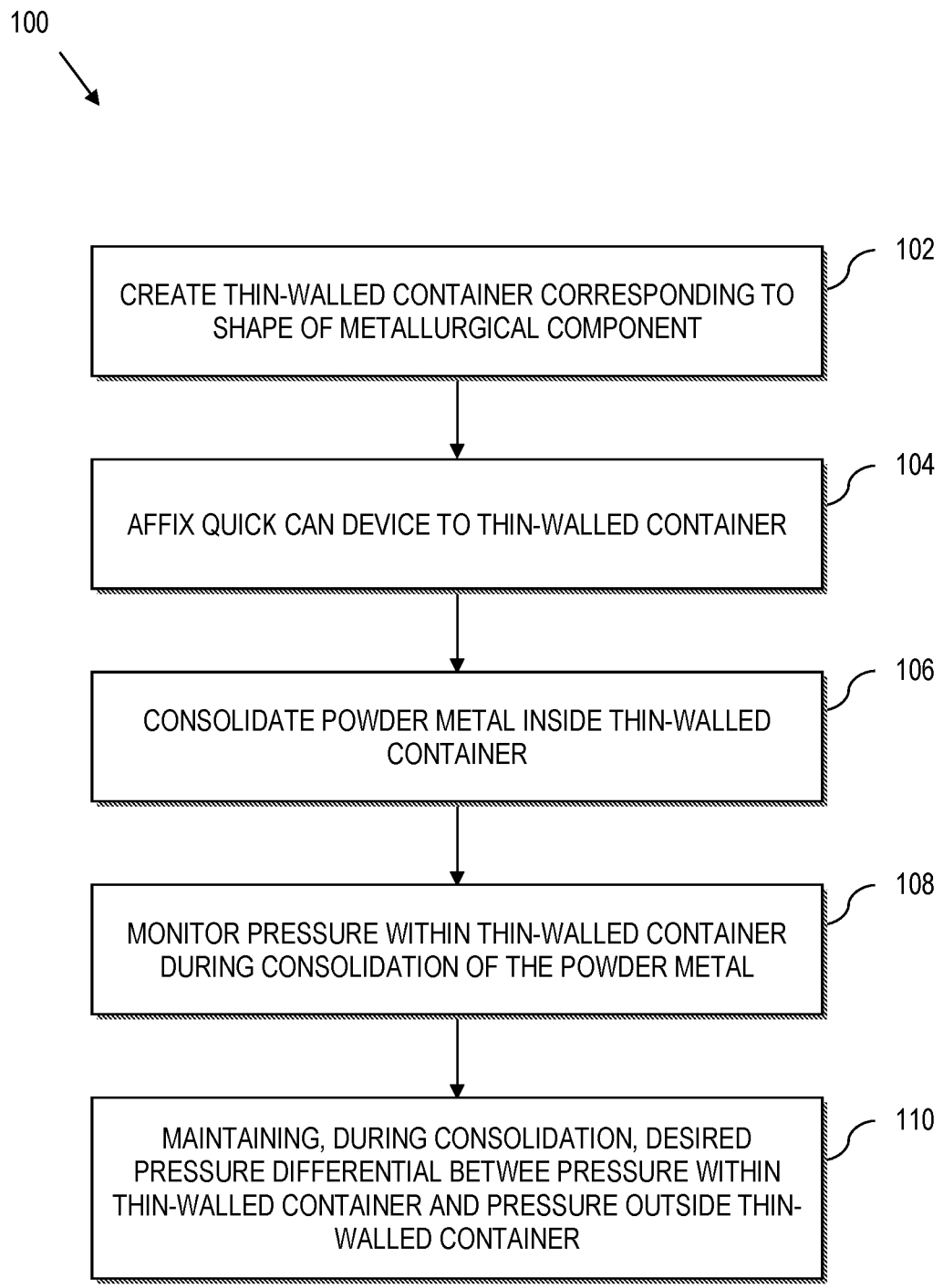
FIG. 1 is a flow diagram illustrating a first process for creating a metallurgical component, according to various aspects of the present disclosure.

Turning now to FIG. 1, a flow chart illustrating a first process 100 for creating a metallurgical component. At 102, a thin-walled container corresponding to a shape of the desired metallurgical component is created. Any method may be used to create the thin-walled container. For example, a preform corresponding to the shape of the metallurgical component may be created from investment casting wax with an electrically conductive coating, from investment casting wax mixed with a conductive additive (e.g., graphite), from metal, from metal alloys, from electrically conductive polymers, from electrically conductive ceramics, etc., or combinations thereof.

Once the preform is created, it is used as a base to create the thin-walled container. For example, electroforming technology may be used to plate a metal (e.g., copper, iron, steel, nickel, etc.) to the preform. On complexly shaped preforms (e.g., a shape with a deep hole), an anode may be placed down the hole to ensure a generally uniform thickness of the plating is maintained over the preform. Usually, one hour of the electroplating process creates a wall 25.4 micrometers thick, regardless of the shape of the preform. Thus, to create a thin-walled container with a wall thickness of two-hundred micrometers, it takes about 7.9 hours.

Another plating technique includes electroless plating of a metal (e.g., copper, nickel) to the preform. Basically, the surface of the preform is treated with a chemical that reacts with the metal to plate the metal to the preform, creating the thin-walled container. Usually, one hour of the electroless plating process creates a wall 7.9-12.7 micrometers thick. Thus, to create a thin-walled container with a wall thickness of two-hundred micrometers, it takes about 19.7 hours.

In yet another plating technique, metal may be applied to the preform using a gas dynamic cold spray. Basically, powder metal is accelerated in a supersonic gas jet to impact and adhere to the preform to create the thin-walled container. The cold spray process is usually quicker than electro plating and electroless plating, but it may not be able to evenly cover complexly shaped preforms.

Once the preform is plated, the preform is removed. For example, an investment wax preform may be removed by subjecting the plated preform to a relatively high temperature (e.g., 121 degrees Celsius) to melt away the wax. If a metallic preform is used, then the preform may be removed using caustics alone or in conjunction with an electrical current. An electrically conductive polymer preform may be removed by heat, chemicals, or both. An electrically conductive ceramic preform may be removed by a caustic etch.

After the preform is removed, the hollow thin-walled container may be filled with powder metal for consolidating. The powder metal may be any powder metal (or alloy) and may be the same metal or a different metal than the metal of the thin-walled container.

Another process to create a thin-walled container includes using additive manufacturing. For example, extrusion deposition, direct ink writing, powder-bed processes (e.g., electron-beam melting, selective laser melting, selective laser sintering, etc.), or combinations thereof may be used to create a hollow thin-walled container, which is then filled with the powder metal. Alternatively, the powder-bed processes may be used to create a thin-walled container such that as the powder metal is scraped onto the work area, the powder metal fills the thin-walled container as the thin-walled container is being built. The result being a fully or partially prefilled thin-walled container. If the thin-walled container is partially prefilled, then more powder metal may be added to the thin-walled container to completely fill it.

Further, using additive manufacturing allows a manufacturer to create a thin-walled container with more than one empty space to be filled with powder metal. For example, a thin-walled container may be created that has a first hollow and a second hollow. The second hollow may be displaced radially, axially, or both (i.e., in any direction) from the first hollow. Then, the two hollows may be filled with different powder metals. For example, the first hollow may be filled with powder alloyed steel and the second hollow may be filled with powder bronze. Note that the use of additive manufacturing to create the thin-walled container does not necessarily require creating a preform.

Any of the processes for creating the thin-walled container listed herein may be used. Further, more than one process may be used for the same thin-walled container. For example, a thin-walled container may be created by using electroplating for a couple hours; then cold spray may be used to finish the creation of the thin-walled container. Even though more than one process may be used, the thickness of the walls of the thin-walled container is still below one millimeter. The second process is not applied to plug any interconnected microporosity that may exist in the thin-walled container; the second process is used to quicken the thin-walled container creation time and lower cost.

Regardless of the process used to create the thin-walled container, the thin-walled container may be filled in a vacuum and sealed. Further, in some cases, an inert atmosphere (e.g., argon) may be pumped into the thin-walled container during filling so the powder metal does not react with oxygen.

After the thin-walled container is created, at 104, a quick-can device is fixed to the thin-walled container. A quick-can device, as described in U.S. Pat. No. 5,110,542 by Conaway entitled RAPID DENSIFICATION OF MATERIALS, the entirety of which is incorporated by reference, allows atmosphere to introduced and evacuated during a consolidation process.

At 106, the powder metal in the thin-walled container is consolidated. For example, the filled thin-walled container with the quick-can affixed may be placed into a hot isostatic press, where it is subjected to high temperature and pressure to consolidate the powder metal. For example, a hot-isostatic-press cycle for a super alloy would include a pressure of one-hundred megapascals (MPa), a time of four hours, and a temperature of one-thousand-one-hundred-and-eighty degrees Celsius (C). As another example, the filled thin-walled container with the quick-can affixed may be placed into a sintering oven, where it is subjected to high temperature to consolidate the powder metal.

During consolidation, an atmosphere may be introduced into the thin-walled container. For example, an atmosphere that removes oxidation from the powder metal (e.g., hydrogen) may be introduced into the inside of the thin-walled container through the quick-can device. As another example, an atmosphere that prevents oxidation (e.g., argon) from the powder metal may be introduced into the inside of the thin-walled container through the quick-can device. Other atmospheres may be introduced as desired. Further, different atmospheres may be introduced at different times during consolidation. Moreover, the quick-can device may evacuate any gas that leaks into the thin-walled container, so any interconnected microporosity does not need to be plugged.

At 108, pressure inside the thin-walled container is monitored. Further, pressure outside of the thin-walled container (e.g., inside the hot isostatic press) is also monitored. For example, individual pressure sensors may be used to monitor the inside and outside pressures in absolute terms. As another example, a sensor that measures a pressure differential between the inside and the outside of the thin-walled container may be used to monitor pressure.

If the pressure inside the thin-walled container varies from the vacuum (i.e., a low pressure differential), then that may be indicative of an interconnected microporosity within the thin-walled container. For example, a small variance from the vacuum pressure may indicate an interconnected microporosity, while a large variance from the vacuum pressure may indicate a quick-can seal leak.

At 110, a desired pressure differential is maintained between the inside and outside of the thin-walled container through the use of the quick can device. For example, if the pressure differential is too low, then a vacuum attached to the quick can device may be activated to provide a higher pressure differential. A pressure differential that remains too low after activation of the vacuum may indicate that the interconnected microporosity is too large and the consolidation process should be stopped to save time and cost. If the microporosity is caught soon enough and the hot isostatic process is terminated, the powder metal in the thin-walled container may be used in another metallurgical component, which saves cost.

The consolidated powder metal forms the desired metallurgical device. In some embodiments, the metallurgical component includes the thin-walled container, and in other embodiments, the thin-walled container is removed from the metallurgical component.

By measuring the pressure differential, interconnected microporosities may be discovered before the component is too far along in the consolidation process. This allows for use of thinner walled containers than other containers (i.e., cans) that use a thicker wall to try to prevent any microporosities from occurring at all. In some cases, the other containers use a layering process that uses a second layer of glass or metal to try to plug any microporosities regardless of whether any microporosities exist in the container at all.

Thus, the thin-walled container approach along with measuring pressure differential saves materials, costs, and time during a hot isostatic pressing process. Further, a thinner-walled container allows for more complex shapes, because a wall thickness of 170-350 microns allows for very fine features.

The following non-limiting example illustrates the process 100 of FIG. 1. A user creates a positive preform of a desired final component out of investment wax, and a metal skin is formed over the wax preform using an electroform process to create a thin-walled container. Then, the wax preform is melted from the thin-walled container, which is then filled with a desired powder metal through an opening in the thin-walled container. A quick-can device is fit over the opening in the thin-walled container and secured. The user then loads the thin-walled container (with the attached quick-can device) into a quick hot isostatic press and connects the quick-can device to head ports of the quick hot isostatic press. The quick hot isostatic press is then sealed and a vacuum is drawn on the thin-walled container through the quick-can device.

Upon reaching a desired level of vacuum in the filled thin-walled container, the hot isostatic press is pressurized and the pressure within the thin-walled container is monitored through the use of a pressure sensor. If the vacuum in the thin-walled container drops, then vacuum pumps of the hot isostatic press restart to draw a vacuum in the thin-walled container. If the vacuum cannot be maintained because of a large variance in the vacuum, then the quick-can device may not be attached properly. At this point, the user may try to reattach the quick-can device to the thin-walled container. However, if the vacuum cannot be maintained because of a small variance, that may be indicative of a large interconnected microporosity within the thin-walled container, and the powder metal within the thin-walled container may be reclaimed. On the other hand, if the vacuum is maintained (with or without the vacuum pumps running), then a hot isostatic press cycle is run by energizing a furnace of the hot isostatic press to bring the thin-walled container to a temperature associated with the hot isostatic press cycle for the powder metal. However, if a variance in the vacuum occurs (that cannot be overcome by starting the vacuum pumps of the hot isostatic press), then cycle may be stopped and the powder metal may be reclaimed if still non-consolidated (as discussed above). If the consolidation cycle completes without a problem, then the thin-walled container is removed (unless the thin-walled container is part of the final component).

Figure 2:
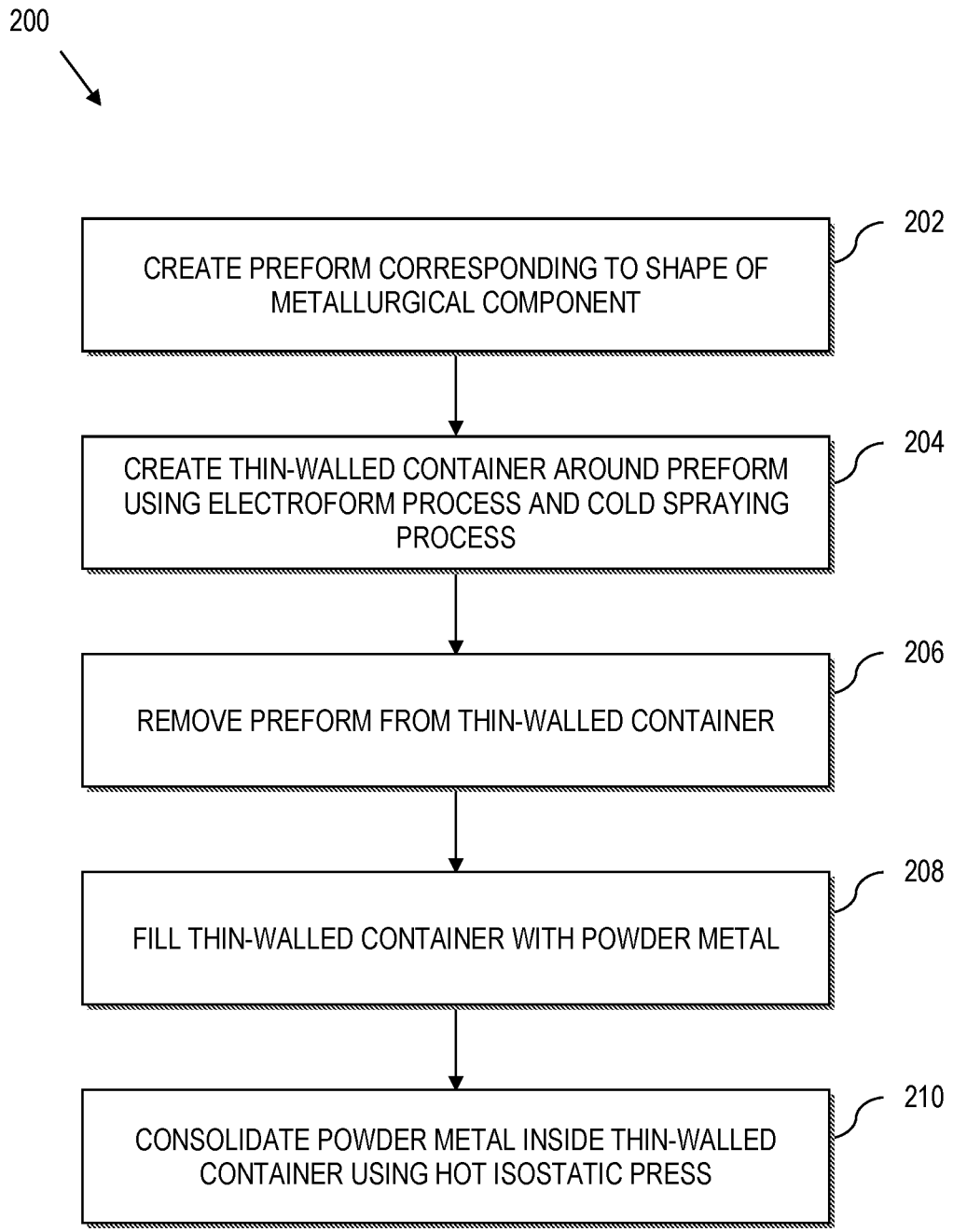
FIG. 2 is a flow diagram illustrating a second process for creating a metallurgical component, according to various aspects of the present disclosure.

Turning now to FIG. 2, a second process 200 for creating a metallurgical component is shown. At 202, a preform corresponding to a shape of the desired metallurgical component is created. As mentioned above, the preform may be created from investment casting wax with an electrically conductive coating, investment casting wax mixed with a conductive additive (e.g., graphite), metal, metal alloy, electrically conductive polymer, electrically conductive ceramic, etc., or combinations thereof.

At 204, a thin-walled container is formed around the preform using both an electroform process and a cold spraying process. As mentioned above, electroforming technology may be used to plate a metal (e.g., copper, iron, steel, nickel, etc.) to the preform. On complexly shaped preforms (e.g., a shape with a deep hole), an anode may be placed down the hole to ensure a generally uniform thickness of the plating is maintained over the preform. Further, metal may be applied to the preform using a gas dynamic cold spray. Basically, powder metal is accelerated in a supersonic gas jet to impact and adhere to the preform to create the thin-walled container. The cold spray process is usually quicker than electro plating, but it may not be able to evenly cover complexly shaped preforms.

The electroplating process may be used directly on the preform, and then the cold spray process may be used on the already electroplated preform. Alternatively, the cold spray process may be used on the preform, and then the electroplating process may be used on the already cold sprayed preform.

At 206, the preform is removed from the thin-walled container. For example, an investment wax preform may be removed by subjecting the plated preform to a relatively high temperature (e.g., 121 degrees Celsius) to melt away the wax. If a metallic preform is used, then the preform may be removed using caustics alone or in conjunction with an electrical current. An electrically conductive polymer preform may be removed by heat, chemicals, or both.

At 208, the thin-walled container is filled with powder metal, and at 210, the powder metal is consolidated in a hot isostatic press or a sintering oven.

The electroplating process can be used on preforms with more complex shapes than the cold spray process, as noted above. On the other hand, the cold spray process takes less time than the electroplating process. Thus, using both processes reduces the amount of time to create a thin-walled container for complexly shaped preforms. However, portions of the resulting thin-walled container may be thinner than other portions (e.g., holes, other complex shaped portions, etc.) of the thin-walled container, because the cold spray may not reach those portions. As such, it is beneficial to use the pressure monitoring process of FIG. 1 to detect any leaks that may occur because of the thinner portions.

Figure 3:
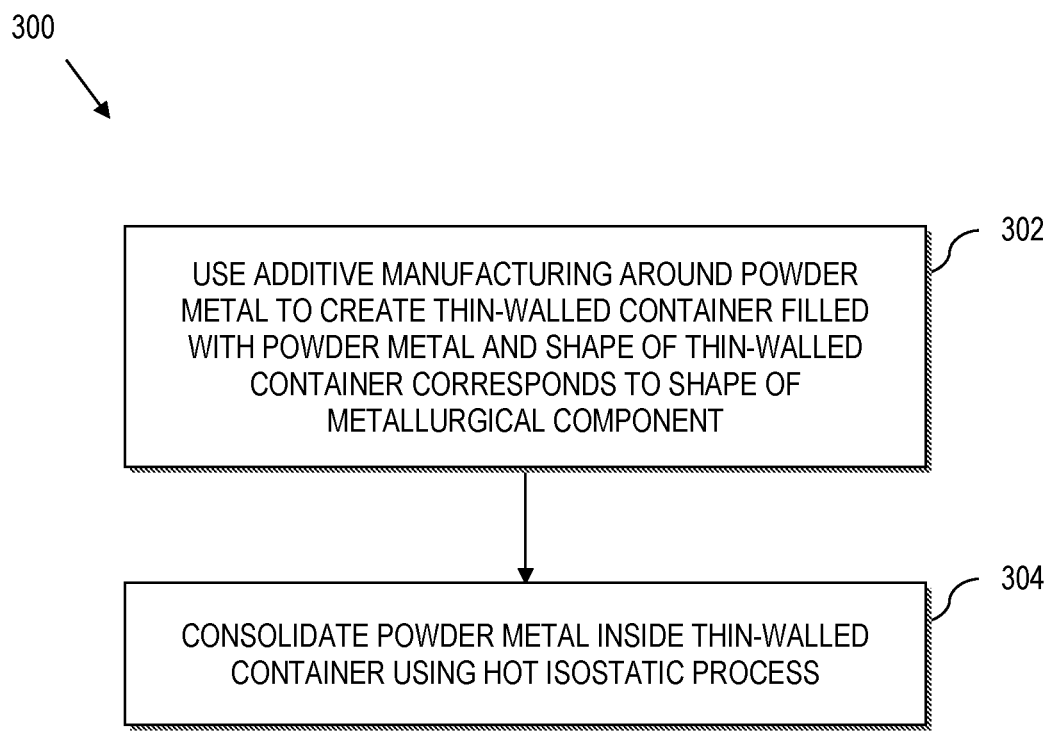
FIG. 3 is a flow diagram illustrating a third process for creating a metallurgical component, according to various aspects of the present disclosure.

FIG. 3 illustrates a third process 300 for creating a metallurgical component. At 302, additive manufacturing is used around powder metal to create a thin-walled container filled with powder metal. For example, an electron beam may be used to melt powder metal in a vacuum such that when the thin-walled container is complete, it is also filled and packed with powder metal. Thus, there is no need to fill a complexly shaped container with powder metal and ensure that there are no portions of the complexly shaped container that may be missing powder metal. Note that the thin-walled container is created without use of a preform.

At 304 the powder metal inside the thin-walled container is consolidated (e.g., using a hot isostatic press or a sintering oven). Instead of removing the thin-walled container, the thin-walled container is consolidated with the powder metal such that they become integrated to form the final metallurgical component.

Figure 4:
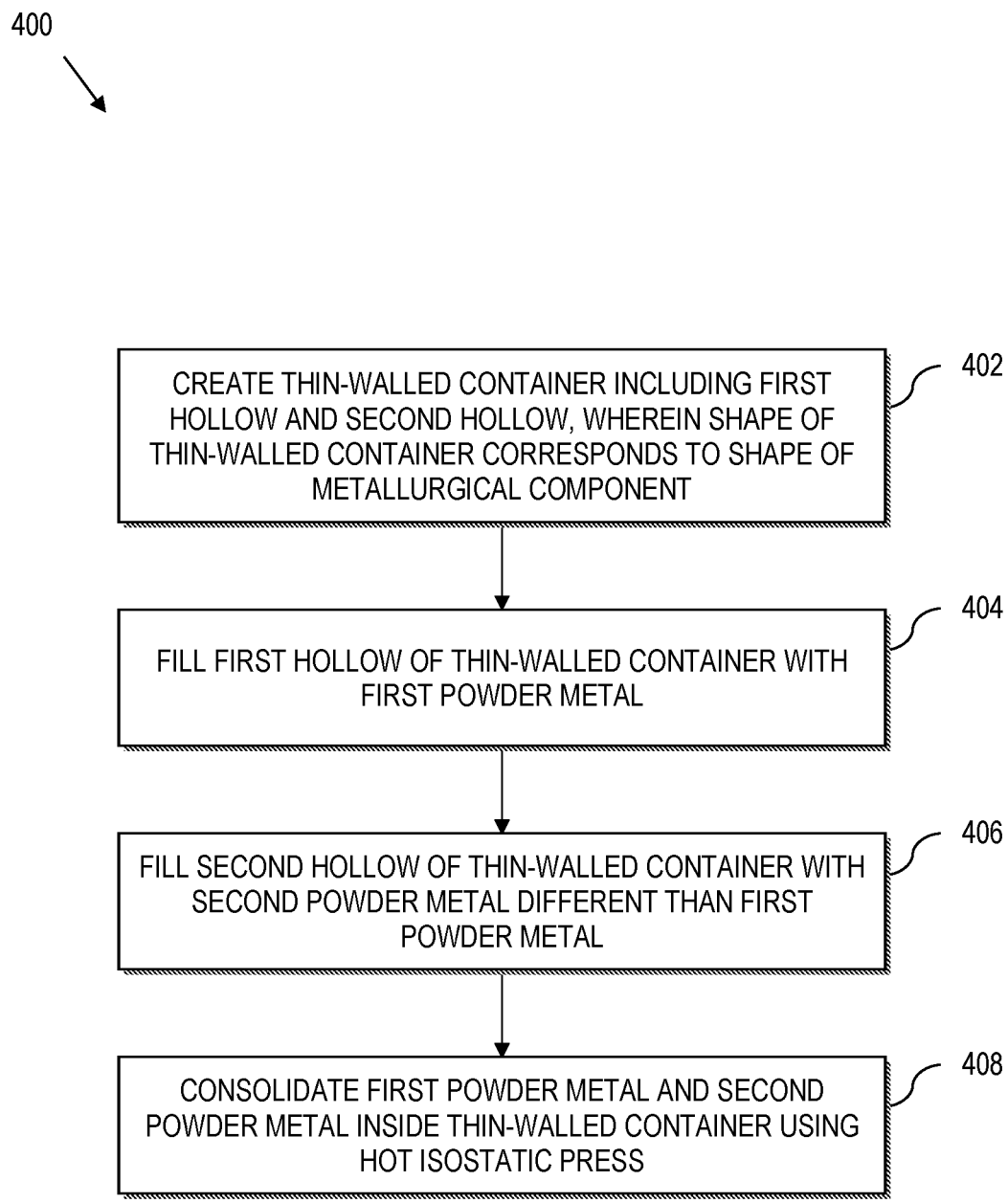
FIG. 4 is a flow diagram illustrating a fourth process for creating a metallurgical component, according to various aspects of the present disclosure.

FIG. 4 illustrates a fourth process 400 for creating a metallurgical component. At 402, a thin-walled container having a first hollow and a second hollow is created. In other words, the thin-walled container includes two empty spaces cut off from each other such that powder metal in one hollow (once the hollow is filled) cannot enter the other hollow. For example, a thin wall may separate the two hollows. The hollows do not need to be the same size or shape.

Further, the hollows may be disposed in any place within the thin-walled container. For example, in a cylindrically shaped thin-walled container, a wall may extend the length of the cylinder at a diameter of the cylinder. Such a configuration creates two hollows disposed from each other. In another example, a cylindrically shaped thin-walled container may include an inner cylinder with a smaller radius than the thin-walled container. The inner cylinder may or may not be coaxial with the thin-walled container and may or may not extend the entire length of the thin-walled container. Such a configuration would include two hollows disposed radially from each other. As another example, a cylindrically shaped thin-walled container may include a horizontal partition to create an upper hollow and a lower hollow. Such a configuration would include two hollows disposed axially. The above dispositions and shapes of the hollows are for illustrative purposes only. Any shape and disposition relative to each other may be used. Further, the thin-walled container may be any shape; the cylindrical shape was just used above for illustrative purposes.

At 404, the first hollow is filled (or prefilled if also using the process of FIG. 3) with a first powder metal, and at 406, the second hollow is filled (or prefilled if also using the process 300 of FIG. 3) with a second powder metal different than the first powder metal. When the thin-walled container is filled, at 408, the powder metals are consolidated using a hot isostatic press (or a sintering oven) to create a bimetal metallurgical component. For a thin-walled container with multiple hollows filled with different powder metals, a hot isostatic press cycle for the highest temperature and longest time duration would be used.

The process 400 may be extended to include any number of hollows. For example, if a first powder with a cycle temperature (T) of 1100 degrees Celsius (C), cycle pressure (P) of 100 Megapascals (MPa), and a cycle time (t) of four hours fills a first hollow; a second powder with a T of 1000 degrees C., a P of 100 MPa, and a t of three hours fills a second hollow; and a third powder with a T of 700 degrees C., a P of 100 MPa, and a t of three hours fills a third hollow, then the cycle parameters for the first powder are used. However, if any of the powders has a melting temperature below the highest temperature, then that combination of powders is not viable and should not be used.

Figure 5:
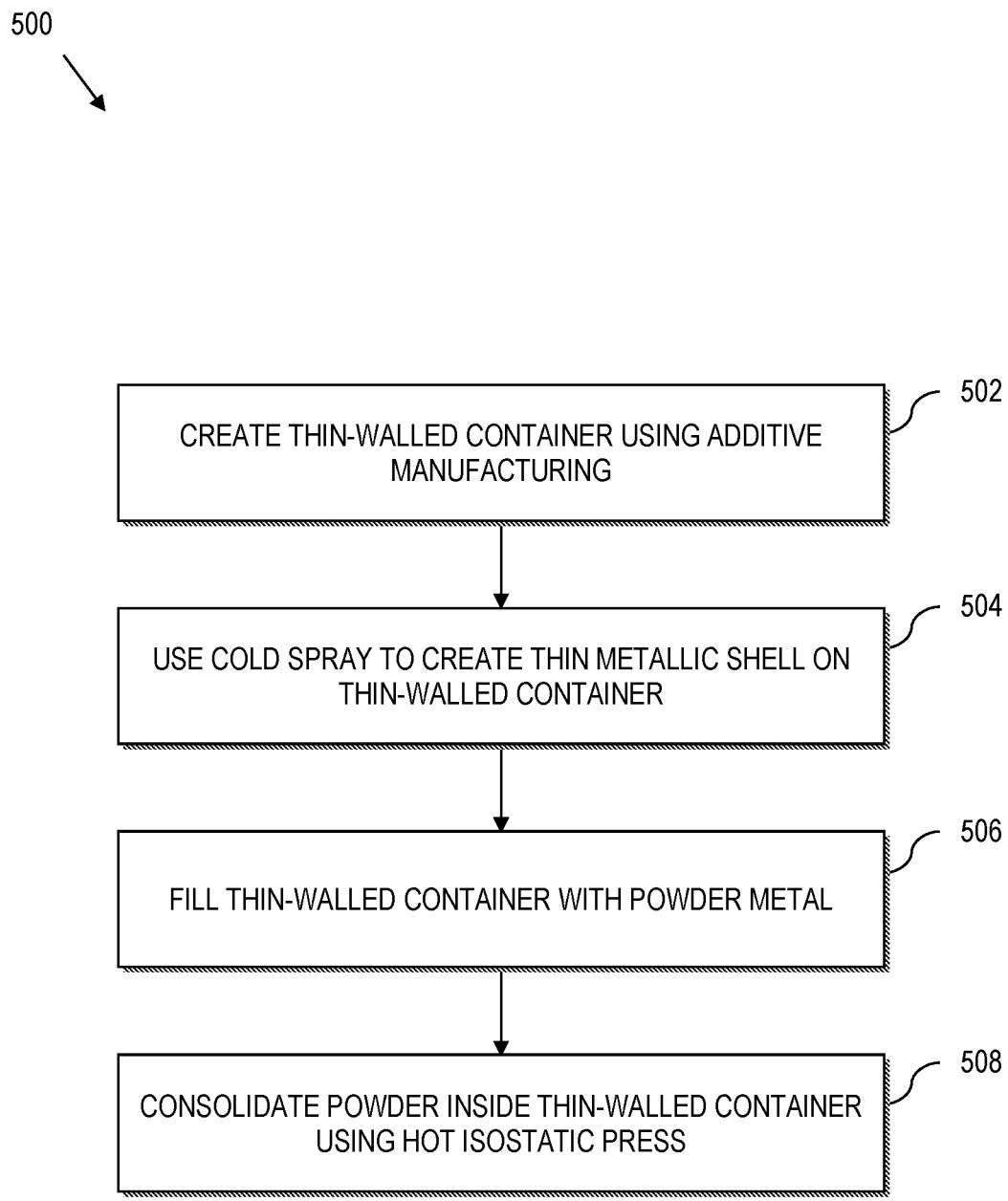
FIG. 5 is a flow diagram illustrating a fifth process for creating a metallurgical component, according to various aspects of the present disclosure.

FIG. 5 illustrates a fifth process 500 for creating a metallurgical component. At 502, a thin-walled container is created using additive manufacturing (prefilled or not prefilled, as discussed above). At 504, a cold spray process is used to create a thin metallic shell on the thin-walled container. At 506, the thin-walled container is filled with a powder metal (e.g., added after creation or prefilled). Then, at 508, the powder metal is consolidated using a hot isostatic press (or a sintering oven) to create the metallurgical component. The thin-walled container may then be removed (e.g., machined, chemical machining, chemical teching, etc.) or may be part of the metallurgical component itself.

Figure 6:
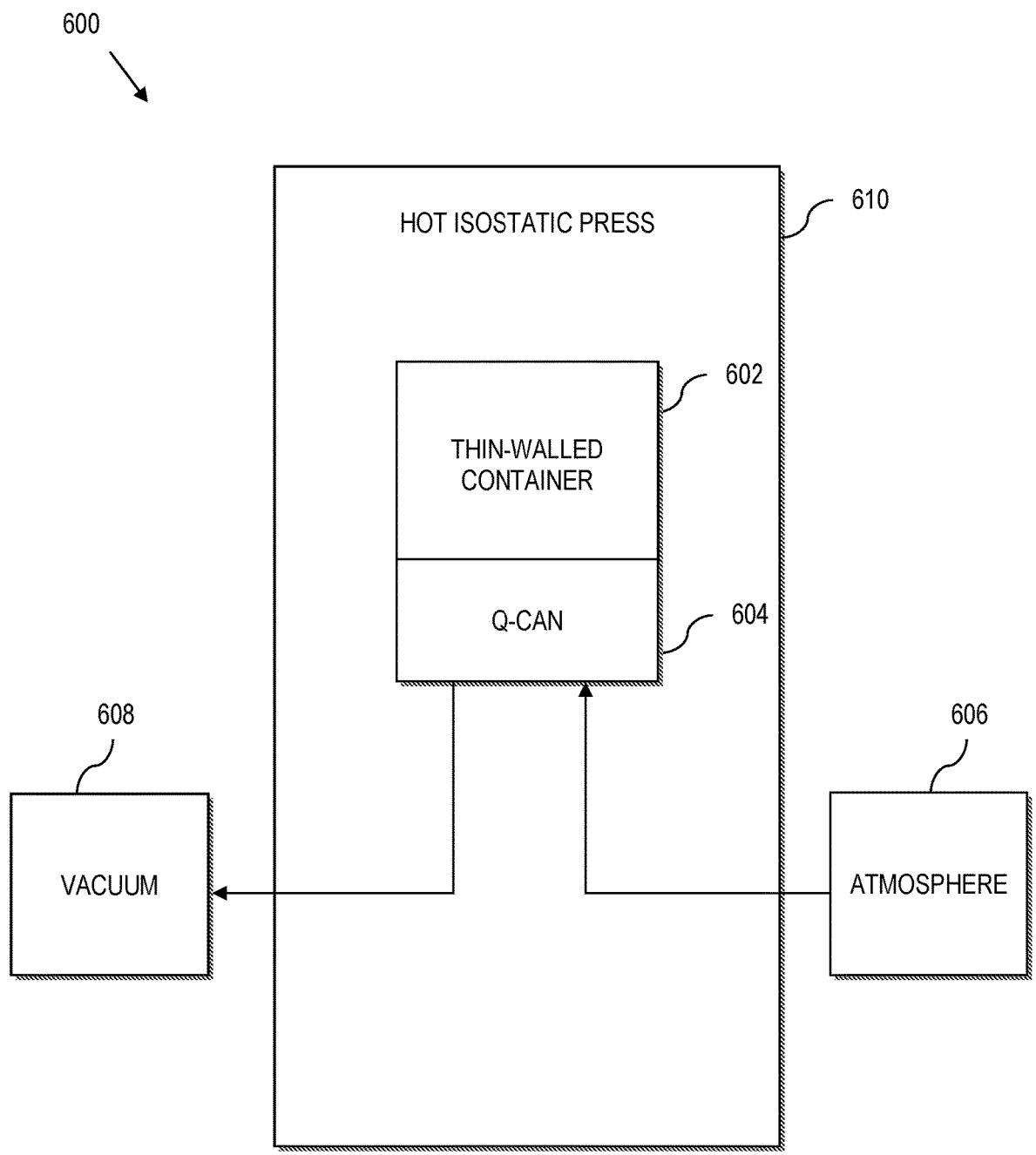
FIG. 6 illustrates a system for carrying out the various processes above, according to various aspects of the present disclosure.

FIG. 6 illustrates a system 600 that may be used to create a metallurgical component. Basically, a thin-walled container 602 is created in any of the ways described above and affixed with a quick can device 604. The quick can device allows atmosphere 606 to be introduced into the thin-walled container 602, allows for a vacuum 608 to remove any atmosphere from the thin-walled container 602, or both. Further, the quick can device 604 can be used to allow pressure readings to be taken from inside the thin-walled container 602 while the thin-walled container 602 is inside a hot isostatic press 610 for consolidation.

Pressure readings from inside the thin-walled container 602 and inside the hot isostatic press 610 may be fed to a processor (e.g., computer, microprocessor, field-programmable gate array, application specific integrated circuit, etc.), where calculations are performed to determine if there is an interconnected microporosity (i.e., a leak) present in the thin-walled container 602. If an interconnected microporosity is present, then the processor may take an action including introducing atmosphere 606 to the thin-walled container 602 through the quick can device 604, evacuating the inside of the thin-walled container 602, stopping the consolidation process, etc.

By measuring the pressure differential, interconnected microporosities may be discovered before the component is too far along in the consolidation process. This allows for use of thinner walled containers than standard containers (i.e., cans) that use a thicker wall to try to prevent any microporosities from occurring at all. In some cases, the standard containers use a layering process that uses a second layer of glass or metal to try to plug any microporosities regardless of whether any microporosities exist in the standard container at all.

Figure 7:
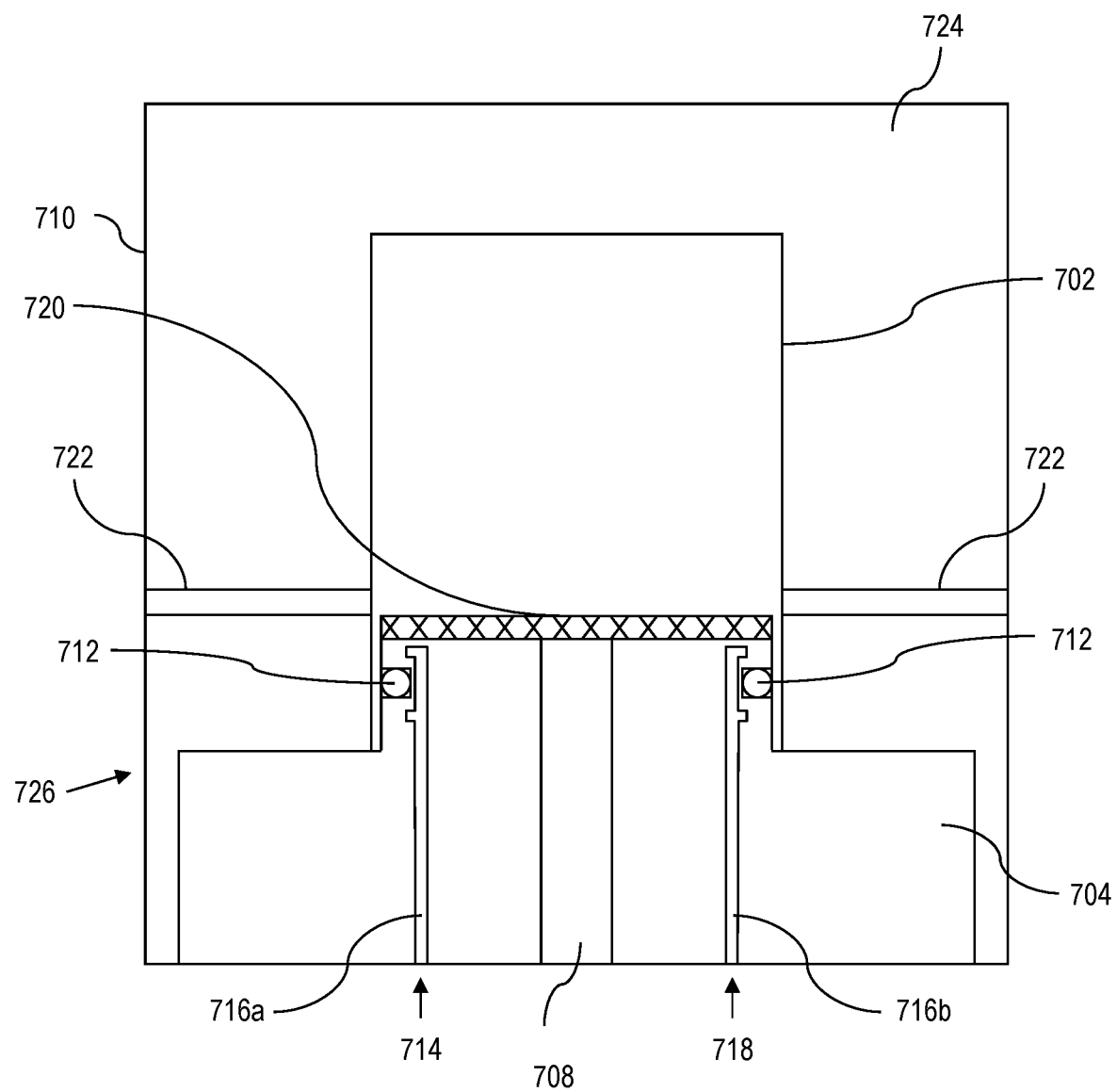
FIG. 7 is a block diagram illustrating a new type of quick can head that allows for cooling an O-ring seal during heating of a can to which the quick can head is attached, according to various aspects of the present disclosure.

Turning now to FIG. 7, a system 700 for consolidating powder metal in a thin-walled container 702 is shown (as discussed herein in reference to FIG. 7 any can type may be used instead of the thin-walled containers described herein). As discussed above, a quick-can head 704 is coupled to the thin-walled container 702 and placed in a hot isostatic press 710. Atmosphere is vacuumed out (as discussed in reference to FIG. 6 above) through a vacuum channel 708.

The quick-can head 704 includes an O-ring 712 that helps seal the quick-can head 704 to the thin-walled container 702. In some embodiments of the quick-can head 704, a cooling channel inlet 714 allows for cooling fluid to be drawn to a cooling channel 716*a-b* to cool down the O-ring 712 during heating. Cooling fluid travels up the cooling channel 716*a*, continues around the O-ring 712, and then down the cooling channel 716*b*, exiting through a cooling channel outlet 718. Thus, users may be able to actively control temperature around the quick-can head 704 in general and specifically around the O-ring 712.

Further, an insulator 720 may be incorporated in the quick-can head 704 to help shield the O-ring 712 from heat. Still further, a heat shield 722 may be placed between an upper portion 724 of the hot isostatic press 710 and a lower portion 726 of the hot isostatic press 710. Again, the insulator 720, the heat shield 722, the cooling channel 716*a-b*, or combinations thereof may be used to help protect the O-ring from high temperatures during heating (including preheating), which should help to keep the O-ring 712 (and possibly the final product) from distorting.

As will be appreciated by one skilled in the art, aspects of the present disclosure may be embodied as a system, method or computer program product. Accordingly, aspects of the present disclosure may take the form of an entirely hardware embodiment or an embodiment combining software and hardware aspects that may all generally be referred to herein as a "circuit," "module," or "system." Furthermore, aspects of the present disclosure may take the form of a computer program product embodied in one or more computer readable storage medium(s) having computer readable program code embodied thereon.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A method for creating a metallurgic component, the method comprising:
    creating a thin-walled container from a metal, wherein the thin-walled container corresponds to a shape of the metallurgic component, wherein the thin-walled container is created without applying a second layer that plugs interconnected microporositites, by:
        using additive manufacturing to create the thin-walled container including a first hollow and a second hollow; and
        filling the first hollow of the thin-walled container with a first powder metal and filling the second hollow of the thin-walled container with a second powder metal different from the first powder metal;
    consolidating the first powder metal and the second powder metal inside the thin-walled container;
    monitoring pressure within the thin-walled container during the consolidation; and
    maintaining, during the consolidation, a desired pressure differential between an inside of the thin-walled container and an outside of the thin-walled container by introducing an inert atmosphere to the thin-walled container or drawing a vacuum in the thin-walled container.

2. The method of claim 1, wherein monitoring pressure within the thin-walled container during the consolidation further includes determining if there is an interconnected microporosity within the thin-walled container.

3. The method of claim 2 further comprising stopping the consolidating if a leak rate of the interconnected microporosity is above a predetermined threshold.

4. The method of claim 1, wherein the second hollow is disposed radially from the first hollow.

5. The method of claim 1, wherein the second hollow is disposed axially from the first hollow.

6. The method of claim 1, wherein introducing the inert atmosphere to the thin-walled container comprises introducing an atmosphere that prevents oxidation of the first powder metal and the second powder metal into the thin-walled container during consolidating of the first powder metal and the second powder metal.

7. The method of claim 1, further comprising removing the thin-walled container after consolidating of the first powder metal and the second powder metal.

* * * * *